(12) United States Patent
Bush et al.

(10) Patent No.: US 8,043,783 B2
(45) Date of Patent: Oct. 25, 2011

(54) PROCESS FOR PREPARING AN ELECTROPHOTOGRAPHIC IMAGING MEMBER

(75) Inventors: Steven D. Bush, Red Creek, NY (US); Kyle B. Tallman, Farmington, NY (US)

(73) Assignee: Xerox Corporation, Norwalk, CT (US)

( * ) Notice: Subject to any disclaimer, the term of this patent is extended or adjusted under 35 U.S.C. 154(b) by 982 days.

(21) Appl. No.: 11/981,201

(22) Filed: Oct. 31, 2007

(65) Prior Publication Data

US 2009/0111044 A1  Apr. 30, 2009

(51) Int. Cl.
*G03G 5/10* (2006.01)

(52) U.S. Cl. .......................... 430/127; 430/131

(58) Field of Classification Search .................. 430/127, 430/131
See application file for complete search history.

(56) References Cited

U.S. PATENT DOCUMENTS

| 3,121,006 A | 2/1964 | Middleton et al. | |
| 2006/0062592 A1* | 3/2006 | Taguchi | 399/111 |
| 2006/0140672 A1* | 6/2006 | Taguchi | 399/117 |

* cited by examiner

*Primary Examiner* — Hoa Le

(74) *Attorney, Agent, or Firm* — Pillsbury Winthrop Shaw Pittman LLP

(57) ABSTRACT

The presently disclosed embodiments are directed to imaging members for use in electrostatographic, including digital, apparatuses. More particularly, the embodiments pertain to processes for preparing the substrate of such imaging members that use laser technology.

12 Claims, 2 Drawing Sheets

PROCESS FOR PREPARING AN ELECTROPHOTOGRAPHIC IMAGING MEMBER

BACKGROUND

The presently disclosed embodiments relate generally to imaging members for use in electrostatographic, including digital, apparatuses. More particularly, the embodiments pertain to processes for preparing the substrate of such imaging members which use lasers. The processes provide a precise and cost-effective manner in which to form the substrate.

Electrophotographic imaging members, e.g., photoreceptors, typically include a photoconductive layer formed on an electrically conductive substrate. The photoconductive layer is an insulator in the substantial absence of light so that electric charges are retained on its surface. Upon exposure to light, charge is generated by the photoactive pigment, and under applied field charge moves through the photoreceptor and the charge is dissipated.

In electrophotography, also known as xerography, electrophotographic imaging or electrostatographic imaging, the surface of an electrophotographic plate, drum, belt or the like (imaging member or photoreceptor) containing a photoconductive insulating layer on a conductive layer is first uniformly electrostatically charged. The imaging member is then exposed to a pattern of activating electromagnetic radiation, such as light. Charge generated by the photoactive pigment move under the force of the applied field. The movement of the charge through the photoreceptor selectively dissipates the charge on the illuminated areas of the photoconductive insulating layer while leaving behind an electrostatic latent image. This electrostatic latent image may then be developed to form a visible image by depositing oppositely charged particles on the surface of the photoconductive insulating layer. The resulting visible image may then be transferred from the imaging member directly or indirectly (such as by a transfer or other member) to a print substrate, such as transparency or paper. The imaging process may be repeated many times with reusable imaging members.

An electrophotographic imaging member may be provided in a number of forms. For example, the imaging member may be a homogeneous layer of a single material such as vitreous selenium or it may be a composite layer containing a photoconductor and another material. In addition, the imaging member may be layered. These layers can be in any order, and sometimes can be combined in a single or mixed layer.

Typical multilayered photoreceptors or imaging members have at least two layers, and may include a substrate, a conductive layer, an optional charge blocking layer, an optional adhesive layer, a photogenerating layer (sometimes referred to as a "charge generation layer," "charge generating layer," or "charge generator layer"), a charge transport layer, an optional overcoating layer and, in some belt embodiments, an anticurl backing layer. In the multilayer configuration, the active layers of the photoreceptor are the charge generation layer (CGL) and the charge transport layer (CTL).

There are different conventional processes with which to make these photoreceptors, however, the conventional processes often experience disadvantages. For example, the substrate requires many steps in its preparation. All photoreceptors must have an insulating barrier between the CGL and the substrate. To prepare an insulating barrier on the substrate, conventional processes involve preparing the surface of the substrate to a predetermined surface roughness and then cleaning the substrate prior to dip coating to form a chemical layer (e.g., an oxide layer) on the substrate surface. After the dip coating, the substrate must be dried in oven conditions which are often difficult to achieve. In addition, the step of preparing the rough surface of the substrate requires lathing to obtain the desired dimensional properties. As lathing uses components such as diamonds and cooling fluids, and involves extensive cleaning and labor, the process becomes quite costly. Thus, conventional processes used to make such photoreceptor layers, while suitable for their intended purpose, do suffer from disadvantages.

The term "photoreceptor" or "photoconductor" is generally used interchangeably with the terms "imaging member." The term "electrostatographic" includes "electrophotographic" and "xerographic." The terms "charge transport molecule" are generally used interchangeably with the terms "hole transport molecule."

SUMMARY

According to aspects illustrated herein, there is provided a process for preparing an imaging member comprising: providing a cylindrical substrate; lathing a surface of the cylindrical substrate with a first laser beam simultaneously with a first gas to achieve surface roughness; oxidizing the surface of the cylindrical substrate with a second laser beam simultaneously with a second gas to form an insulating layer; and forming a charge generation layer over the cylindrical substrate. In embodiments, the first gas and second gas are the same. In other embodiments, the first gas and the second gas are different.

Another embodiment may provide a process for preparing an imaging member comprising providing a cylindrical substrate, lathing a surface of the cylindrical substrate with a first laser beam simultaneously with oxygen to achieve surface roughness of from about 1 micron to about 6 microns, oxidizing the surface of the cylindrical substrate with a second laser beam simultaneously with oxygen to form an insulating layer; and forming a charge generation layer over the cylindrical substrate, and the second laser beam heats the surface of the cylindrical substrate to a temperature of from about 660° C. to about 1200° C. In embodiments, the flow rate of oxygen is about 0.001 square inches per second.

Yet another embodiment provides a system for preparing an imaging member comprising a cylindrical substrate, a laser for applying a laser beam to a surface of the cylindrical substrate, a gas gun for applying a gas to the surface of the cylindrical substrate, a rotation device for rotating the cylindrical substrate about an axis while applying the laser beam and the gas to the surface of the cylindrical substrate, and a controller for controlling a rate of rotation by the rotation device and a rate of application of the laser beam and the gas to the surface of the cylindrical substrate.

BRIEF DESCRIPTION OF THE DRAWINGS

For a better understanding, reference may be had to the accompanying figures.

DETAILED DESCRIPTION

Figure 1:
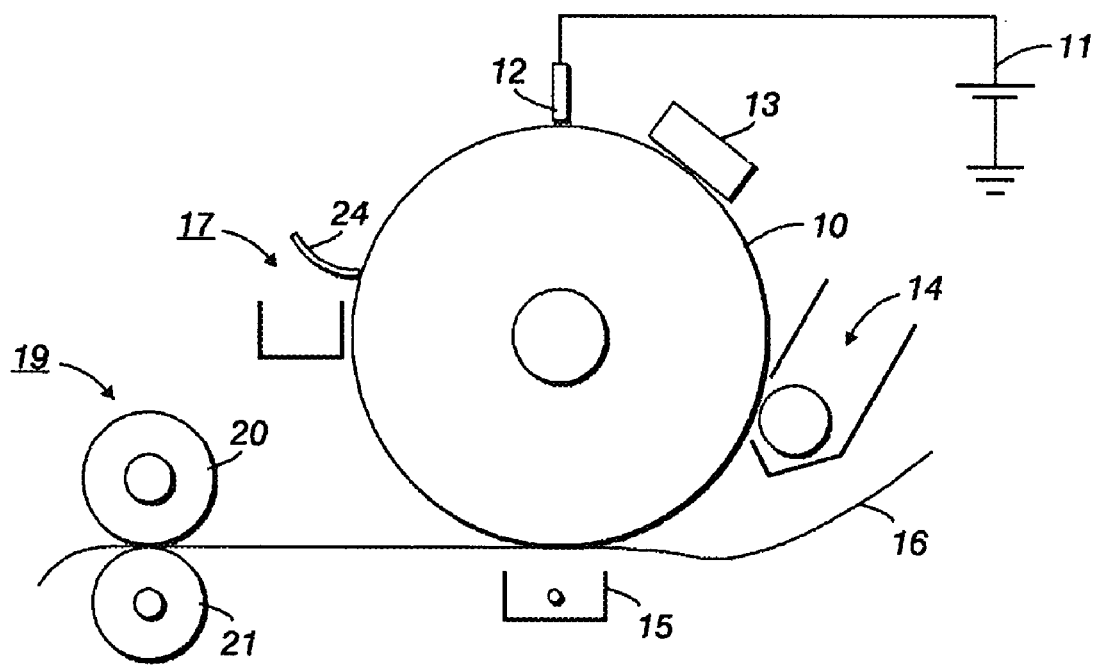
FIG. 1 is a schematic nonstructural view showing an image forming apparatus made in accordance with the present embodiments.

In the following description, reference is made to the accompanying drawings, which form a part hereof and which illustrate several embodiments. It is understood that other embodiments may be utilized and structural and operational changes may be made without departure from the scope of the present disclosure. The same reference numerals are used to identify the same structure in different figures unless specified otherwise. The structures in the figures are not drawn according to their relative proportions and the drawings should not be interpreted as limiting the disclosure in size, relative size, or location.

The presently disclosed embodiments are directed generally to processes for preparing an imaging member or photoreceptor which provide a precise and cost-effective manner in which to form the substrate. The processes utilize laser technology to prepare the surface of the substrate and subsequently form the conductive insulating layer to the surface of the substrate.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of an electrical charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. In embodiments, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 24 (as shown in FIG. 1), brush, or other cleaning apparatus.

Figure 2:
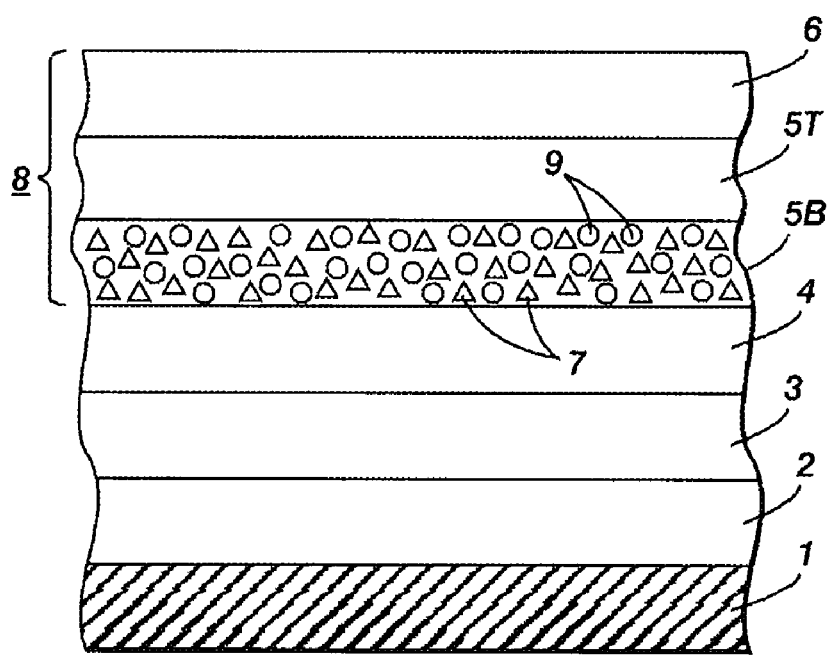
FIG. 2 is a cross-sectional view of an imaging member showing various layers made in accordance with the present embodiments.

Electrophotographic imaging members are well known in the art. Electrophotographic imaging members may be prepared by any suitable technique. Referring to FIG. 2, typically, a flexible or rigid substrate 1 is provided with a photoconductive insulating layer or coating 2, for example, an insulating oxide layer. The substrate may be opaque or substantially transparent and may comprise any suitable material having the required mechanical properties. Accordingly, the substrate may comprise a layer of an electrically non-conductive or conductive material such as an inorganic or an organic composition. As electrically non-conducting materials, there may be employed various resins known for this purpose including polyesters, polycarbonates, polyamides, polyurethanes, and the like which are flexible as thin webs. An electrically conducting substrate may be any metal, for example, aluminum, nickel, steel, copper, and the like or a polymeric material, as described above, filled with an electrically conducting substance, such as carbon, metallic powder, and the like or an organic electrically conducting material. The electrically insulating or conductive substrate may be in the form of an endless flexible belt, a web, a rigid cylinder, a sheet and the like. The thickness of the substrate layer depends on numerous factors, including strength desired and economical considerations. Thus, for a drum, this layer may be of substantial thickness of, for example, up to many centimeters or of a minimum thickness of less than a millimeter. Similarly, a flexible belt may be of substantial thickness, for example, about 250 micrometers, or of minimum thickness less than 50 micrometers, provided there are no adverse effects on the final electrophotographic device.

The present embodiments streamline the preparation of the substrate and help reduce the high costs and numerous steps generally associated with preparation of the substrate. By using laser technology, the surface of the substrate does not need to be lathed by conventional equipment which requires expensive components and much labor efforts used in honing and cleaning the substrate material. In addition, through use of the laser system, there is no need to employ the dip coating step to form the oxide layer and the subsequent oven drying step.

In the present embodiments, there is provided a process for preparing the substrate for a photoreceptor. In embodiments, a laser and gas gun is used to lathe the substrate material to obtain a substrate surface having the desired dimensional properties. In embodiments, the substrate is lathed to a surface roughness of from about 1 micron to about 6 microns, or from about 1 micron to about 2 microns. In embodiments, the resulting thickness of the substrate is from about 0.02 microns to about 3 microns. After the substrate surface is prepared, the laser is further used to form an insulating barrier between the CGL and the substrate. To prepare the insulating barrier on the substrate, laser and gas gun is used in combination to heat the surface of the substrate to a temperature high enough to cause the surface to form the insulating layer. In embodiments, the insulating layer formed is an oxide layer. The depth of the insulating layer is controlled by controlling the flow of the gas and the temperature achieved on the surface of the substrate. For example, a sufficient temperature is from about 660° C. to about 1200° C., or from about 660° C. to about 1000° C. Once the temperature reaches the point where the aluminum melts, oxide formation will begin. The depth of the oxide layer will be determined by the depth of aluminum that is melted. The temperature range can be increased with process conditions, for example, rotational speed and axial speed. The flow rate of gas is dependent upon the power of the laser used as the cooling effect of the gas must be overcome by the laser.

In embodiments, the gas used in the gas gun is carbon dioxide. In further embodiments, other gas that may be used is oxygen or any similar combustible gas. The use of oxygen gas promotes the formation of oxide. While the oxide can be formed without use of oxygen, the process and area coverage is more controllable when used with oxygen. The laser beam and gas may be applied to the cylindrical substrate at a rate of about 0.001 square inches per second. The rate is limited by the power and dot size of the laser being used—e.g., a larger laser would be able to produce a much faster and larger feed rate.

Figure 3:
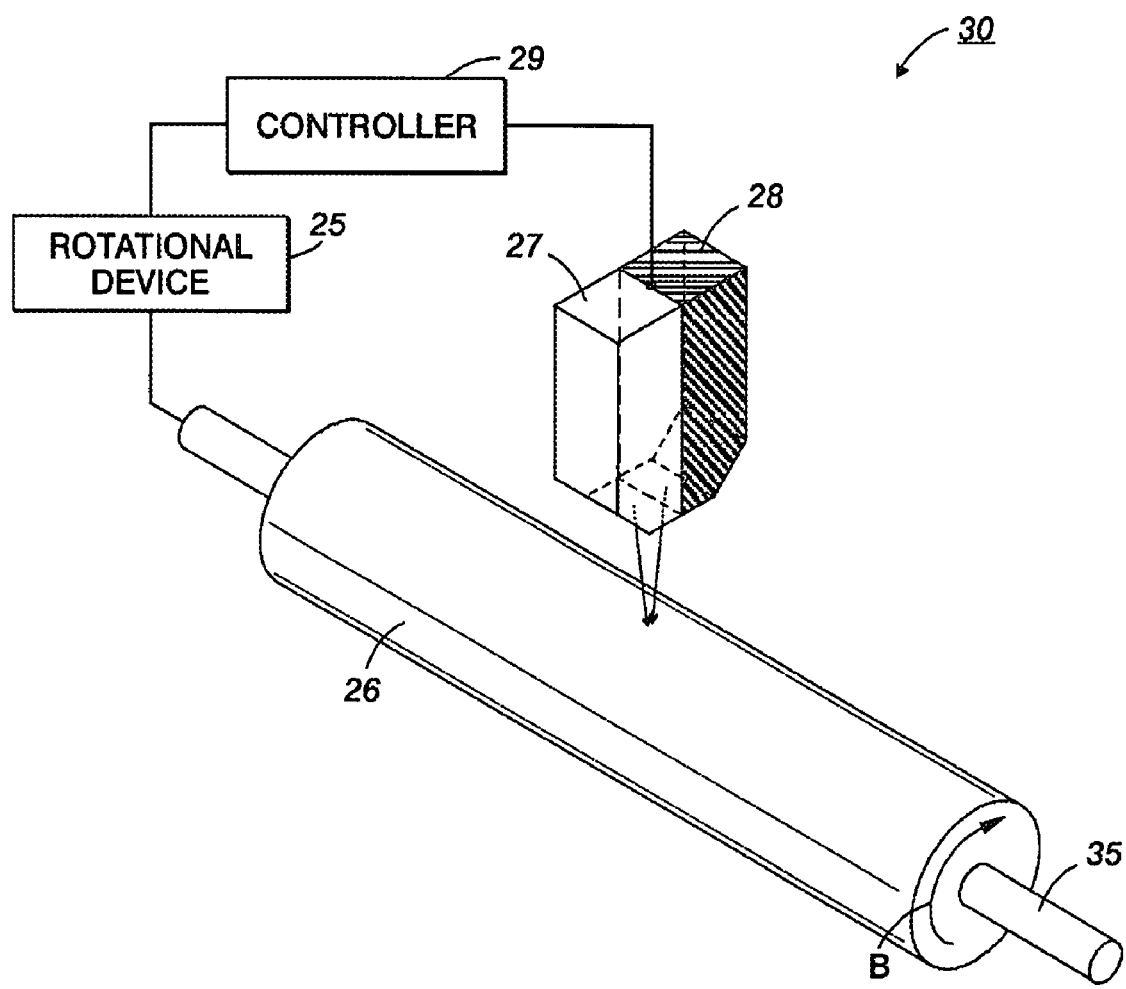
FIG. 3 is schematic diagram illustrating an embodiment described herein.

In further embodiments, there is provided a system for preparing a substrate using laser technology, as shown in FIG. 3. The substrate preparation system 30 includes a controller 29, a laser 27, a gas gun 28 and a rotation device 25. The rotation device 25 rotates a photoreceptor drum substrate 26 that is to be prepared. The rotation device 25 rotates the drum 26 about a rotation axis 35 in the direction shown by arrow B. The rotation device 25 may, for example, have a structure similar to that of a lathe or the like, in which a conventional metal lathe turns a workpiece while feeding a cutting tool parallel to the axis of rotation. However, it should be appreciated that any device that effects rotary movement may also be used as the rotation device 25. A controller 29 communicates to the rotation device 25, either through wired or wireless means, and controls driving of the drum 26 by the rotation device 25. Various control data may be inputted into the controller 29, such as for example, the desired dimensions of the substrate. Control programs and necessary data used by the controller 29 may be stored in a memory (not shown). The controller 29 may be implemented on, for example, a computer. The controller 29 also may communicate with the laser and gas gun to control the flow of the gas and the temperature achieved on the surface of the substrate. The laser and gas gun may be guided manually or automatically through appropriate machinery. While the object 26 has been described as a drum, it could also be in the form of a continuous belt. In this case, the object may be held in a cylindrical shape, e.g., fitted over a cylindrical drum, or may be stretched between two rollers, for example.

An optional hole blocking layer or undercoat layer 3 may be applied to the substrate 1 or coating. Any suitable and conventional blocking layer capable of forming an electronic barrier to holes between the adjacent photoconductive layer 8 (or electrophotographic imaging layer 8) and the underlying conductive surface 2 of substrate 1 may be used.

An optional adhesive layer 4 may be applied to the hole-blocking layer 3. Any suitable adhesive layer well known in the art may be used. Typical adhesive layer materials include, for example, polyesters, polyurethanes, and the like. Satisfactory results may be achieved with adhesive layer thickness between about 0.05 micrometer (500 angstroms) and about 0.3 micrometer (3,000 angstroms). Conventional techniques for applying an adhesive layer coating mixture to the hole blocking layer include spraying, dip coating, roll coating, wire wound rod coating, gravure coating, Bird applicator coating, and the like. Drying of the deposited coating may be effected by any suitable conventional technique such as oven drying, infrared radiation drying, air drying and the like.

At least one electrophotographic imaging layer 8 is formed on the adhesive layer 4, blocking layer 3 or substrate 1. The electrophotographic imaging layer 8 has both a charge generation layer 5 and charge transport layer 6. The insulating layer 2 is needed between the substrate 1 and the charge generation layer 5 because the insulating layer prevents the charge from discharging through the substrate before the image can be generated and toner collected and transferred to the paper of the intermediate transfer belt.

Charge generator layers may comprise amorphous films of selenium and alloys of selenium and arsenic, tellurium, germanium and the like, hydrogenated amorphous silicon and compounds of silicon and germanium, carbon, oxygen, nitrogen and the like fabricated by vacuum evaporation or deposition. The charge-generator layers may also comprise inorganic pigments of crystalline selenium and its alloys; Group II-VI compounds; and organic pigments such as quinacridones, polycyclic pigments such as dibromo anthanthrone pigments, perylene and perinone diamines, polynuclear aromatic quinones, azo pigments including bis-, tris- and tetrakis-azos; and the like dispersed in a film forming polymeric binder and fabricated by solvent coating techniques.

Phthalocyanines have been employed as photogenerating materials for use in laser printers using infrared exposure systems. Infrared sensitivity is required for photoreceptors exposed to low-cost semiconductor laser diode light exposure devices. The absorption spectrum and photosensitivity of the phthalocyanines depend on the central metal atom of the compound. Many metal phthalocyanines have been reported and include, oxyvanadium phthalocyanine, chloroaluminum phthalocyanine, copper phthalocyanine, oxytitanium phthalocyanine, chlorogallium phthalocyanine, hydroxygallium phthalocyanine magnesium phthalocyanine and metal-free phthalocyanine. The phthalocyanines exist in many crystal forms, and have a strong influence on photogeneration.

Any suitable polymeric film forming binder material may be employed as the matrix in the charge-generating (photogenerating) binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrenebutadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in the resinous binder composition in various amounts. Generally, however, from about 5 percent by volume to about 90 percent by volume of the photogenerating pigment is dispersed in about 10 percent by volume to about 95 percent by volume of the resinous binder, or from about 20 percent by volume to about 30 percent by volume of the photogenerating pigment is dispersed in about 70 percent by volume to about 80 percent by volume of the resinous binder composition. In one embodiment, about 8 percent by volume of the photogenerating pigment is dispersed in about 92 percent by volume of the resinous binder composition. The photogenerator layers can also fabricated by vacuum sublimation in which case there is no binder.

Any suitable and conventional technique may be used to mix and thereafter apply the photogenerating layer coating mixture. Typical application techniques include spraying, dip coating, roll coating, wire wound rod coating, vacuum sublimation, and the like. For some applications, the generator layer may be fabricated in a dot or line pattern. Removing of the solvent of a solvent coated layer may be effected by any suitable conventional technique such as oven drying, infrared radiation drying, air drying and the like.

The charge transport layer 6 may comprise a charge transporting molecule dissolved or molecularly dispersed in a film forming electrically inert polymer such as a polycarbonate. The term "dissolved" as employed herein is defined herein as forming a solution in which the charge transporting molecule is dissolved in the polymer to form a homogeneous phase. The expression "molecularly dispersed" is used herein is defined as a charge transporting molecule dispersed in the polymer, the charge transporting molecules being dispersed in the polymer on a molecular scale. Any suitable charge transporting molecule or electrically active small molecule may be employed in the charge transport layer of this invention. The expression charge transporting "small" is defined herein as a monomer that allows the free charge photogenerated in the transport layer to be transported across the transport layer. Typical charge transporting small molecules include, for example, pyrazolines such as 1-phenyl-3-(4'-diethylamino styryl)-5-(4''-diethylamino phenyl)pyrazoline, diamines such as N,N'-diphenyl-N,N'-bis(3-methylphenyl)-(1,1'-biphenyl)-4,4'-diamine, hydrazones such as N-phenyl-N-methyl-3-(9-ethyl)carbazyl hydrazone and 4-diethyl amino benzaldehyde-1,2-diphenyl hydrazone, and oxadiazoles such as 2,5-bis(4-N,N'diethylaminophenyl)-1,2,4-oxadiazole, stilbenes and the like. However, to avoid cycle-up in machines with high throughput, the charge transport layer should be substantially free (less than about two percent) of di or triamino-triphenyl methane. As indicated above, suitable electrically active small molecule charge transporting compounds are dissolved or molecularly dispersed in electrically inactive polymeric film forming materials. A small molecule charge transporting compound that permits injection of holes from the pigment into the charge generating layer with high efficiency and transports them across the charge transport layer with very short transit times is N,N'-diphenyl-N,N'-bis (3-methylphenyl)-(1,1'-biphenyl)-4,4'-diamine (TPD).

If desired, the charge transport material in the charge transport layer may comprise a polymeric charge transport material or a combination of a small molecule charge transport material and a polymeric charge transport material.

Any suitable electrically inactive resin binder insoluble in the alcohol solvent may be employed in the charge transport layer of this invention. Typical inactive resin binders include polycarbonate resin (such as MAKROLON), polyester, polyarylate, polyacrylate, polyether, polysulfone, and the like. Molecular weights can vary, for example, from about 20,000 to about 150,000. Examples of binders include polycarbonates such as poly(4,4'-isopropylidene-diphenylene)carbonate (also referred to as bisphenol-A-polycarbonate, poly(4,4'-cyclohexylidinediphenylene) carbonate (referred to as bisphenol-Z polycarbonate), poly(4,4'-isopropylidene-3,3'-dimethyl-diphenyl)carbonate (also referred to as bisphenol-C-polycarbonate) and the like. Any suitable charge transporting polymer may also be used in the charge transporting layer of this invention. The charge transporting polymer should be insoluble in the alcohol solvent employed to apply the overcoat layer of this invention. These electrically active charge transporting polymeric materials should be capable of supporting the injection of photogenerated holes from the charge generation material and be capable of allowing the transport of these holes there through.

Any suitable and conventional technique may be used to mix and thereafter apply the charge transport layer coating mixture to the charge generating layer. Typical application techniques include spraying, dip coating, roll coating, wire wound rod coating, and the like. Drying of the deposited coating may be effected by any suitable conventional technique such as oven drying, infrared radiation drying, air drying and the like.

Generally, the thickness of the charge transport layer is between about 10 and about 50 micrometers, or from about 10 $\mu$m to about 40 $\mu$m, but thicknesses outside this range can also be used. For example, in one embodiment, the thickness is about 27 $\mu$m. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layers can be maintained from about 2:1 to 200:1 and in some instances as great as 400:1. The charge transport layer, is substantially non-absorbing to visible light or radiation in the region of intended use but is electrically "active" in that it allows the injection of photogenerated holes from the photoconductive layer, e.g., charge generation layer, and allows these holes to be transported through itself to selectively discharge a surface charge on the surface of the active layer.

In embodiments, an overcoat layer may be coated on the charge-transporting layer.

Any suitable or conventional technique may be used to mix and thereafter apply the overcoat layer coating mixture on the charge transport layer. Typical application techniques include spraying, dip coating, roll coating, wire wound rod coating, and the like. Drying of the deposited coating may be effected by any suitable conventional technique such as oven drying, infrared radiation drying, air drying, and the like. The dried overcoating should transport holes during imaging and should not have too high a free carrier concentration. Free carrier concentration in the overcoat increases the dark decay. In embodiments, the dark decay of the overcoated layer should be about the same as that of the uncoated, control device.

Various exemplary embodiments encompassed herein include a method of imaging which includes generating an electrostatic latent image on an imaging member, developing a latent image, and transferring the developed electrostatic image to a suitable substrate.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The example set forth herein below and is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter.

Example 1

Analysis of Laser Cut Aluminum Drum

A laser cut aluminum OPC drum was submitted for surface analysis. The drum was cut with a $CO_2$ laser in an attempt to convert the surface of the drum to $Al_2O_3$. A sample of the drum was analyzed with X-ray Photoelectron Spectroscopy (XPS), a surface analysis technique that provides elemental, chemical state and quantitative analyses for the top 2-5 nanometers of a sample's surface. XPS was employed to determine if aluminum oxide was present on the surface. A region of about 1 millimeter in diameter was analyzed and was presented to the x-ray source by adhering a piece of the material to a stainless steel sample holder. The limits of detection of the technique are about 0.1 atom percent for the top 2-5 nm. The quantitative analyses are precise to within 5% relative for major constituents and 10% relative for minor constituents.

Depth profiling was attempted by XPS to determine the oxide layer thickness, however, the sample surface was too rough to obtain any results with this method. The sample was submitted to scanning electron microscopy and energy dispersive X-ray spectrometry (SEM/EDXS) in an attempt to determine the oxide layer thickness.

Results

It was found that the sample contained carbon, oxygen, sodium, magnesium, aluminum, chlorine and calcium. The carbon concentration at the surface of the drum was 14.33 atomic percent, while the oxygen concentration was 60.65 atomic percent. Sodium, magnesium, chlorine and calcium were detected at low levels. The aluminum concentration at the surface of the drum was 19.94 atomic percent. The aluminum was present as an oxide. The results of the quantitative surface analysis are summarized in Table I below. Concentrations are reported in units of atomic percent for the samples.

TABLE 1

Results of the Quantitative XPS Analysis (atomic percent)

| Sample | At % C | At % O | At % Na | At % Mg | At % Al | At % Cl | At % Ca |
|---|---|---|---|---|---|---|---|
| Laser Cut Aluminum Drum | 14.33 | 60.65 | 1.88 | 2.02 | 19.94 | 0.84 | 0.34 |

Example 2

Cross-Sectional Analysis of Laser-Anodized Drum

A section from an aluminum OPC drum anodized with a laser beam was received for cross-sectional analysis by scanning electron microscopy and energy dispersive X-ray spectrometry (SEM/EDXS) to measure the thickness of its $Al_2O_3$ coating. The sample was a small section cut from the laser-anodized aluminum OPC drum. The sample was encased in epoxy resin, ground and polished to give a view of its cross section. The sample was then secured vertically onto a sample mount and the analysis was performed on the uncoated sample in a Hitachi S-4800 FESEM at an accelerating voltage of 10 kV using the lower SE detector. Representative micrographs were acquired at magnifications of 10 kX, 15 kX and 20 kX.

Results

The analysis indicated that the surface of the drum was very rough and irregular. As a result, the thickness of the oxide coating was found to be quite variable, ranging from much less than 100 nm to about 2.0 µm.

All the patents and applications referred to herein are hereby specifically, and totally incorporated herein by reference in their entirety in the instant specification.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process for preparing an imaging member comprising:
providing a cylindrical substrate;
lathing a surface of the cylindrical substrate with a first laser beam simultaneously with a first gas to achieve surface roughness;
oxidizing the surface of the cylindrical substrate with a second laser beam simultaneously with a second gas to form an insulating layer; and
forming a charge generation layer over the cylindrical substrate.

2. The process of claim 1, wherein the first and second laser beams are applied to the cylindrical substrate at a rate of about 0.001 square inches per second.

3. The process of claim 1, wherein the cylindrical substrate has a resulting surface roughness of from about 1 micron to about 6 microns.

4. The process of claim 3, wherein the cylindrical substrate has a resulting surface roughness of from about 1 micron to about 2 microns.

5. The process of claim 4, wherein the cylindrical substrate has a resulting surface roughness of from about 0.02 microns to about 3 microns.

6. The process of claim 1, wherein the first and second laser beams heat the surface of the cylindrical substrate to a temperature of from about 660° C. to about 1200° C.

7. The process of claim 1, wherein the first and second gas is carbon dioxide.

8. The process of claim 1, wherein the first and second gas is oxygen.

9. The process of claim 1, wherein the first and second gas are different.

10. The process of claim 1, wherein an undercoat layer and an adhesive layer are formed between the insulating layer and the charge generation layer.

11. The process of claim 1, wherein the cylindrical substrate is selected from the group consisting of a drum and a belt.

12. A process for preparing an imaging member comprising:
providing a cylindrical substrate;
lathing a surface of the cylindrical substrate with a first laser beam simultaneously with oxygen gas to achieve surface roughness of from about 1 micron to about 6 microns;
oxidizing the surface of the cylindrical substrate with a second laser beam simultaneously with oxygen gas to form an insulating layer; and
forming a charge generation layer over the cylindrical substrate, wherein a flow rate of the oxygen gas is about 0.001 square inches per second, and the second laser beam heats the surface of the cylindrical substrate to a temperature of from about 660° C. to about 1200° C.

* * * * *